Patented Aug. 20, 1946

2,405,973

UNITED STATES PATENT OFFICE 2,405,973

PREPARATION OF STARCH ETHERS

Peter L. Nichols, Jr., and Robert M. Hamilton, Philadelphia, Pa., assignors to United States of America, as represented by the Secretary of Agriculture No Drawing. Application January 20, 1944, Serial No. 518,975

4 Claims. (Cl. 260—209)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to improvements in the preparation of starch ethers, and especially to processes for etherifying acid-swelled starch with alkyl, aryl, and aralkyl halides and sulfates.

Starch ethers are usually prepared from alkali starch, the latter being formed by treating starch with aqueous alkali. In the preparation of starch ethers by this method, the alkali starch is heated with an alkylating agent, such as an alkyl halide, or other etherifying agents, such as benzyl chloride. The time required to produce the desired product, however, has always been excessive, and the reaction has been characterized by the use of an excessively large amount of etherifying agent and an accompanying formation of undesirable by-products, such as alcohols and alkyl, aryl, or aralkyl ethers. A large excess of the etherifying agent is required, especially where the agent is easily hydrolyzed.

When prepared from a non-uniform alkali starch, the ethers are likewise non-uniform in composition, and do not readily form clear solutions in solvents unless first subjected to special purification treatment.

We have now found that the foregoing difficulties can be substantially avoided by employing a carboxylic acid as a swelling agent to pretreat the starch and etherifying the latter in a substantially anhydrous reaction mixture comprising caustic alkali and the etherifying agent with or without an inert diluent.

The primary object of this invention is to obtain highly substituted starch ethers. Such derivatives exhibit solubility in a great variety of organic solvents and compatibility with a large number of plasticizers. Also, coatings made from the higher substituted ether derivatives show increased resistance to moisture.

A further object is to prepare starch ethers at lower reaction temperatures and shorter reaction times, and thus considerably reduce the cost of the product.

A further object is the preparation of starch ethers at atmospheric pressure and relatively low temperatures instead of the high pressures and temperatures generally employed. The products obtained in this way are more uniform than those prepared by the usual methods.

The following table indicates the amount of substitution in the starch molecule obtained by the method described in this application as compared with the usual methods of etherification.

| Derivative | Method | Reaction time, hrs. | Temp. (bath), °C. | Ether groups per glucose unit |
|---|---|---|---|---|
| Benzyl starch | Starch slurried in water and aqueous NaOH added to produce a 30% solution. | 29 | 110 | 1.6 |
| Do | Starch pretreated with 50% aqueous NaOH. | 20 | 115 | 1.9 |
| Do | Formic acid pretreated starch. | 4 | 110 | 2.0 |
| Allyl starch | Starch suspended in 15% aqueous NaOH. | 22 | 100 | 0.3 |
| Do | Starch pretreated with 50% aqueous NaOH. | 22 | 100 | 1.2 |
| Do | Formic acid pretreated starch. | 1 | 100 | 0.9 |
| Do | ____do____ | 16 | 100 | 2.6 |
| Ethyl starch | ____do____ | 6 | 85 | 1.9 |

The general methods described herein are applicable not only to starch but also carbohydrates of similar constitution, such as cellulose and other polysaccharides.

In carrying out the invention disclosed in the present application, the usual treatment of starch with aqueous caustic alkali is eliminated and air or oven-dried starch is pretreated with formic acid, preferably of 90 percent concentration, although it should be understood that any other concentration found to be advantageous may be used. Usually it is desirable to suspend the starch in an inert medium, such as benzene or toluene, before adding the formic acid as the swelling agent. In the preparation of starch ethers, the aforesaid formic acid treated starch, with or without an inert suspending agent such as benzene or toluene, is mixed with powdered caustic alkali, then etherified with the customary etherifying agents such as alkyl halides or sulfates, aryl halides, and aralkyl halides, and so forth. Because of the small amount of water present in the reaction mixture, hydrolysis of the etherifying agent is substantially eliminated, and as a result only a slight excess of etherifying agent is required to produce highly substituted starch ethers.

By similar procedures, other etherifying agents than those named in the examples may be employed. The preferred materials for most purposes are the various aliphatic or aryl-aliphatic halides, or aliphatic sulfates, to form the corresponding starch ethers which may be alkyl ethers, such as methyl, ethyl, propyl, butyl, amyl, or higher alkyl ethers of starch, unsaturated ethers such as the allyl, methyl allyl, crotonyl, or cinnamyl ethers of starch, and benzyl or other aralkyl ethers.

Our invention is illustrated by the following examples:

Example I 50 parts of air-dried starch (containing about 10% moisture) was rapidly stirred with 50 parts of 90 percent formic acid. In about 3 minutes, the original slurry changed to a white fluffy material. This was mixed with 150 parts of sodium hydroxide pellets and rapidly transferred to a reaction flask fitted with a reflux condenser and a mechanical stirrer. A mixture of 125 parts of allyl bromide and 125 parts of benzene, or other inert hydrocarbon, was added and the temperature raised to 100° C. In four hours allyl starch containing 1.5 allyl groups per glucose residue was obtained after purification by steam distillation and washing with water.

Example II 50 parts of air-dried starch was suspended in 50 parts of toluene in a reaction flask, fitted with a reflux condenser, and rapidly stirred while 50 parts of 90 percent formic acid was added. In approximately 8 minutes, the original slurry changed to a white fluffy mass. 100 parts of toluene were added, then 150 parts of sodium hydroxide pellets. After approximately 10 minutes, 160 parts of diethyl sulfate was added and the temperature raised to 85° C. The reaction mixture was steam distilled after stirring for 6 hours at 85° C., and the product was then washed with water to remove the alkali. Analysis indicated 1.9 ethyl groups per glucose residue. The product was soluble in organic solvents but insoluble in water.

Example III 50 parts of dry starch was stirred with 42 parts of 90 percent formic acid until a white fluffy material was obtained. To the formic swelled starch placed in a reaction vessel equipped with a reflux condenser and mechanical stirrer was added 79 parts of sodium hydroxide pellets. The mass was stirred vigorously during the addition of 102 parts of benzyl chloride and 58 parts of toluene. The reaction mixture was stirred 4 hours at 110° to 115° C. The reaction mass was purified by steam distillation and then washed with water until free of alkali and dried. Analysis indicated two benzyl groups per glucose residue. The product was soluble in organic solvents and insoluble in water.

Example IV 50 parts of air-dried starch was suspended in 50 parts of an inert hydrocarbon, such as benzene, in a reaction flask and rapidly stirred; 50 parts of 90 percent formic acid was added. In approximately 8 minutes, the slurry had changed to a white fluffy material. 100 parts of the inert hydrocarbon and then 150 parts of solid sodium hydroxide was added. After approximately 10 minutes, 125 parts of allyl bromide was also added and the temperature was maintained at 100° C. for 4 hours. The highly substituted allyl starch ether was steam distilled, to recover the hydrocarbon, and was then precipitated in water. Analysis indicated 1.5 allyl groups per glucose residue.

Having thus described our invention, we claim:

1. In the process of preparing carbohydrate ethers from formic acid swelled starch, the step which comprises etherifying the swelled starch in a substantially anhydrous mixture of caustic alkali and an etherifying agent.

2. The process of preparing starch ethers which comprises swelling substantially dry starch in formic acid, and then etherifying the swelled starch in a substantially anhydrous mixture of caustic alkali and an etherifying agent.

3. The process of preparing starch ethers which comprises swelling substantially dry starch in formic acid, and then etherifying the swelled starch in a substantially anhydrous mixture of sodium hydroxide and an etherifying agent.

4. The process of preparing starch ethers which comprises suspending substantially dry starch in a non-reactive medium, swelling the suspended starch with formic acid and then etherifying the swelled starch with a substantially anhydrous mixture of caustic alkali and an etherifying agent, in the presence of an additional amount of the non-reactive medium.

PETER L. NICHOLS, Jr.
ROBERT M. HAMILTON.